United States Patent [19]
Koga et al.

[11] Patent Number: 5,976,606
[45] Date of Patent: Nov. 2, 1999

[54] PROCESS FOR PRODUCING DHA-CONTAINING TOFU OR SOYBEAN MILK DRINK, OR DRY POWDER THEREOF

[75] Inventors: Kenji Koga, Sayama; Kazunobu Ogawa, Gyoda; Yoshitaka Nadachi, Tokyo; Makoto Karishu, Gyoda; Kohta Hatano, Kumagaya; Yasuzo Uchida, Tokyo, all of Japan

[73] Assignees: Janiftec, Inc.; Asahi Food Processing Co., Ltd., both of Tokyo, Japan

[21] Appl. No.: 09/043,929

[22] PCT Filed: Mar. 21, 1997

[86] PCT No.: PCT/JP97/00925

§ 371 Date: Mar. 30, 1998

§ 102(e) Date: Mar. 30, 1998

[87] PCT Pub. No.: WO98/04154

PCT Pub. Date: Feb. 5, 1998

[30] Foreign Application Priority Data

Jul. 30, 1996 [JP] Japan ................................ 8-199969

[51] Int. Cl.$^6$ ................................ A23L 1/20; A23L 2/38
[52] U.S. Cl. ................................ 426/634; 426/598
[58] Field of Search ...................... 426/634, 598

[56] References Cited

FOREIGN PATENT DOCUMENTS 7-255406  1/1995  Japan .

OTHER PUBLICATIONS

Patent Abstracts of Japan. Abs Grp No: C446. Abs vol. No. 11, No. 282. Inventors: Takenawa et al, Sep. 11, 1987.

*Primary Examiner*—Anthony J. Weier
*Attorney, Agent, or Firm*—Wenderoth, Lind & Ponac L.L.P.

[57] ABSTRACT

The present invention provides a process for producing DHA (docosahexaenoic acid)-containing tofu or soybean milk drink, or a dry powder thereof which does not influence taste even if a DHA-containing fish oil is incorporated at a high concentration, which is stable and of which starting materials are inexpensive. A DHA-containing fish oil emulsion is prepared by mixing soybean milk with a DHA-containing fish oil at a weight ratio of 1:0.2 to 1, and stirring the mixture. Then, soybean milk drink can be produced by further diluting this emulsion with soybean milk to give a predetermined DHA concentration. Still further, DHA-containing tofu can be produced by coagulating the soybean milk containing this emulsion with the addition of a coagulant. Since the same soybean milk as the starting material of tofu or soybean milk drink is used as an emulsifying agent, such a product is obtained that even if DHA is contained at a high concentration, this does not influence a taste or properties of the product. A dry powder can be obtained by freeze-drying, vacuum-drying or spray-drying this tofu or soybean milk drink as required.

4 Claims, No Drawings

5,976,606

PROCESS FOR PRODUCING DHA-CONTAINING TOFU OR SOYBEAN MILK DRINK, OR DRY POWDER THEREOF

This application is a 371 application of International Application No. PCT/JP97/00925 filed Mar. 21, 1997.

FIELD OF THE INVENTION

The present invention relates to a process for producing tofu (bean curd), soybean milk drink or a dry powder thereof which contains DHA (docosahexaenoic acid) at a high concentration and which does not have an offensive smell of a fish oil.

BACKGROUND ART

DHA is one of n-3 highly unsaturated fatty acids that in recent years, have attracted attention as essential fatty acids having a wide variety of physiological activities. DHA has been known to have an antithrombogenic activity, an anti-inflammatory activity, an antiallergic activity and an antitumor activity and to be important in developing and maintaining a nerve tissue of brain, retina or the like; it has therefore aroused interest. DHA is contained in a fish oil extracted from fish and shellfish in a relatively large amount. Such a DHA-containing fish oil has been marketed as a capsule-type healthy food formed by coating the same with gelatin or the like. Meanwhile, attempts have been made to add the same to general foods such as a beverage, a confectionery, a dairy dish, a seasoning and the like, and there are a large number of commercial products.

However, since DHA has a long chain and many double bonds and gives a peculiar smell derived from a fish oil, the purification, the concentration and the anti-oxidation thereof are technically difficult in many cases. As a result, a DHA-containing fish oil which is subjected to purification, emulsification, milling and anti-oxidation such as addition of an antioxidant is costly. For this reason, DHA is currently added to food only in an amount which is far from an average amount of DHA (from 0.5 g to 1.0 g per day) ingested by a Japanese from fish and shellfish. Further, in the conventional technique, after the DHA-containing fish oil emulsified or milled is added to a food, the stability of DHA is not maintained satisfactorily, so that such a food cannot be stored. Thus, the addition of DHA at a high concentration is prevented.

On the other hand, soybeans abundantly contain proteins having a high essential amino acid content and excellent in vivo absorbability, linoleic acid which is an n-6 highly unsaturated fatty acid, and functional substances such as lecithin and saponin having a cholesterol-decreasing activity owing to their emulsifiability. Further, soybeans, as well as garlic, onion and the like, have drawn attention as a food having an activity to prevent tumor. Tofu or soybean milk drink which is produced using such soybeans as a starting material naturally contains these useful substances abundantly, and is eaten and drunk every day as a traditional healthy food in Japan.

If DHA can be added to the above-mentioned tofu or soybean milk drink which is the typical healthy food in Japan, a person who does not eat fish frequently can naturally ingest DHA from a dairy meal or drink, and his health can be expected to thereby be maintained or promoted. It is considered that DHA is added to tofu or soybean milk drink by a method in which an emulsion having a high storage stability, which is obtained by emulsifying a DHA-containing fish oil using an appropriate emulsifying agent and adding a preservative such as sugar or salt at a high concentration to increase a storage stability, is added; a method in which the above-described emulsion is added as a dry powder; or a method in which a powder obtained by adsorbing a DHA-containing fish oil onto a porous carrier is added.

However, there has been no report indicating that DHA is added to tofu or soybean milk drink in such an amount that a Japanese can ingest DHA in a day from fish or shellfish, nor has the commercial product been marketed. The reason is that not only the above-described emulsion, its powder or porous support-adsorbed powder of the DHA-containing fish oil is expensive relative to the DHA content, thereby increasing the costs of the starting materials for tofu or soybean milk drink, but also the emulsifying agent, the preservative, the porous carrier and the like which are used influence the taste and the properties of tofu or soybean milk drink, thereby preventing the addition of DHA at a high concentration.

DISCLOSURE OF THE INVENTION

Accordingly, an object of the present invention is to provide a process for producing DHA-containing tofu or soybean milk drink, or a dry powder thereof which does not influence taste even if a DHA-containing fish oil is incorporated at a high concentration, which is stable and of which starting materials are inexpensive.

A process for producing DHA-containing tofu in accordance with the present invention comprises mixing soybean milk with a DHA-containing fish oil at a weight ratio of 1:0.2 to 1, stirring the resulting mixture to form a DHA-containing fish oil emulsion, diluting this emulsion with soybean milk, and then coagulating the resulting dilute with the addition of a coagulant.

A dry powder of DHA-containing tofu can be produced by further dry-milling the above-obtained tofu.

Still further, a process for producing DHA-containing soybean milk drink in accordance with the present invention comprises mixing soybean milk with a DHA-containing fish oil at a weight ratio of 1:0.2 to 1, stirring the mixture to form a DHA-containing fish oil emulsion, and diluting this emulsion with soybean milk.

A dry powder of DHA-containing soybean milk can be produced by further dry-milling the above-obtained soybean milk drink.

The term "a DHA-containing fish oil" in the present specification is used as a general term of an oil which is extracted from fish and shellfish in a usual manner, and partially purified through purification steps such as deoxidation, decoloration, deodorization and the like and which is composed mainly of triglycerides including highly unsaturated fatty acids such as DHA, EPA (eicosapentaenoic acid) and the like.

An emulsifying agent and a preservative which are ordinarily used in producing a DHA-containing fish oil emulsion have an adverse effect on a flavor of tofu in many cases. However, in the present invention, since the same soybean milk as the starting material of tofu or soybean milk drink is used as an emulsifying agent to emulsify a DHA-containing fish oil. Therefore, even when tofu or soybean milk drink is produced by adding the resulting emulsion in a large amount to soybean milk, a product containing DHA at a high concentration can be produced without impairing the flavor and the properties of the tofu or the soybean milk drink. Furthermore, in accordance with the present invention, even though a slight fish smell is given out in a DHA-containing fish oil, it is masked by emulsifying this oil with soybean milk, with the result that tofu or soybean milk drink obtained by adding this emulsion does not have a fish smell, and it is almost the same as that obtained without the addition of the emulsion.

BEST MODE FOR CARRYING OUT THE INVENTION

In producing DHA-containing tofu according to the present invention, soybean milk used as a starting material of tofu and also as an emulsifying agent is first prepared. The preparation of the soybean milk can be carried out by employing a method which has been so far used conventionally. That is, soybeans are dipped in water overnight, and water is further added thereto. The soybean/water mixture is ground to obtain a slurry (gojiru). This slurry is heated, and then filtered to separate a refuse (okara) as a solid content to obtain soybean milk as a liquid.

A part of this soybean milk is used as an emulsifying agent. This soybean milk and a DHA-containing fish oil are mixed at such a ratio (weight ratio) that the soybean milk is 1 while the fish oil is between 0.2 and 1, and the mixture is stirred to prepare an emulsion of the DHA-containing fish oil. This emulsification procedure can be conducted using a relatively small-sized stirrer, and besides the oil content is high, with the result that bubbling little occurs in the stirring and effective emulsification can be conducted without the use of an expensive stirrer fitted with a deaerator.

The thus-obtained emulsion containing DHA at a high concentration is diluted with the addition of soybean milk to adjust DHA to a predetermined concentration, and the resulting dilute is gently stirred and dispersed. Then, the resulting dispersion is coagulated with the addition of a coagulant such as magnesium chloride in a usual manner to produce tofu. Silken tofu, pressed silken tofu or packed silken tofu can be produced by slightly changing the coagulation procedure in a usual manner.

Also when DHA-containing soybean milk drink is produced according to the present invention, a soybean milk which is used as a starting material of soybean milk drink and also as an emulsifying agent is first produced. The soybean milk which is a starting material of soybean milk drink can also be produced in the same manner as the above-descrobed soybean milk for tofu. However, a process for producing soybean milk drink which is currently mass-produced mostly includes a step of deactivating lipoxygenase that gives a soybean milk smell and a vacuum treatment step for deodorization. That is, the enzyme is deactivated by jetting high-pressure water vapor to peeled soybeans. Then, the resulting soybeans are mixed with hot water and ground using grinder to form a slurry. Thereafter, a refuse as a solid content is separated using a centrifugal separator or a filter to obtain soybean milk.

A part of this soybean milk drink is used as an emulsifying agent. This soybean milk and a DHA-containing fish oil are mixed at such a ratio (weight ratio) that the soybean milk is 1 while the fish oil is between 0.2 and 1, and the mixture is stirred to prepare an emulsion of the DHA-containing fish oil. This is the same as the above-mentioned process for producing tofu. In this case as well, the emulsification procedure can be conducted using a relatively small-sized stirrer, and besides the oil content is high, with the result that bubbling little occurs in the stirring and effective emulsification can be conducted without the use of an expensive stirrer fitted with a deaerator. The thus-obtained emulsion containing DHA at a high concentration is diluted with the addition of the soybean milk to adjust DHA to a predetermined concentration, making it possible to produce a soybean milk drink product. A usual commercial soybean milk drink product is produced by further sterilizing the product for several tens of seconds, then deaerating the sterilized product under reduced pressure, homogenizing the resulting product using a high-pressure emulsifier, and packing it into a container.

The DHA-containing tofu obtained in accordance with the present invention can be eaten, like the conventional tofu, as chilled tofu, simmering tofu, miso soup or the like. The DHA-containing soybean milk drink obtained in accordance with the present invention can also be drunk like the conventional drinking soybean milk. Further, the DHA-containing tofu or soybean milk drink can be dried and milled by using, for example, freeze-drying, vacuum drying, spray drying or the like. The dry powder obtained is a functional food material containing DHA, EPA, a soybean protein and a soybean oil, and it can be used as a processed food material or a healthy food through tableting or the like.

The present invention is illustrated more specifically by referring to the following Examples and Comparative Example.

EXAMPLE 1

Ten kilograms of soybeans were dipped in water for 12 hours, and ground with the addition of water to obtain 55 liters of a slurry. This slurry was heated at 100° C. for 5 minutes, and then filtered to obtain 45 liters of soybean milk as a liquid.

Two kilograms of the resulting soybean milk and 1 kg of a DHA-containing fish oil (DHA content 23 wt. %) having a slight fish smell were mixed, and stirred at 7,500 rpm for 10 minutes using a homomixer (T. K. Homomixer MARK II, supplied by Tokushu Kika Kogyo K. K.) to give a DHA-containing fish oil emulsion (DHA content approximately 7.7 wt. %).

The above-mentioned soybean milk cooled to 10° C. was divided into portions each having a weight of 10 kg. The above-mentioned emulsion was added thereto in an amount of 0 g, 400 g, 800 g or 1,600 g, and they were stirred and mixed using a spatula. Subsequently, 0.25 wt. % of magnesium chloride was added thereto as a coagulant. A predetermined amount of the mixture was charged into a container for packed silken tofu, and the container was sealed. This container was heated at 90° C. for 40 minutes, and then cooled to obtain DHA-containing tofu.

On the production day, a panel test or sensory test (panelist: 3 men and 2 women) was conducted. Consequently, no fish small was given even in the maximum concentration-added sample (sample with the addition of 1,600 g of the emulsion), and the evaluation was that none of the added samples was different from the non-added sample.

After the resulting tofu was stored at 10° C. for 7 days, the sensory evaluation was conducted. The evaluation was that there was no difference between the added samples and the non-added sample. Thus, a good stability was shown.

On the production day and after 7 days of the storage at 10° C., a miso soup and simmering tofu were made by using the resulting DHA-containing tofu, and compared with those made by using DHA-free tofu. As a result, the DHA-containing tofu was not different at all from the DHA-free tofu in the color, the smell, the taste and the feeling upon eating.

The tofu obtained by mixing 10 kg of the soybean milk with 1,600 g of the emulsion contained approximately 1.1 g of DHA per 100 g of the tofu. Since a standard weight of a commercially available piece of tofu is approximately 300 g, an average amount of DHA ingested by a Japanese in a day from fish and shellfish can be satisfied well by eating ⅓ of apiece of tofu.

COMPARATIVE EXAMPLE 1

A DHA-containing fish oil emulsion (DHA content approximately 7.5 wt. %) was prepared using the same DHA-containing fish oil as that used in Example 1, water, sodium caseinate as a commercial emulsifying agent and lecithin.

The soybean milk prepared in the same manner as in Example 1 was divided into portions each having a weight of 10 kg. The above-mentioned emulsion was added thereto in an amount of 0 g, 100 g, 200 g or 500 g, and they were stirred and mixed using a spatula. Subsequently, 0.25 wt. % of magnesium chloride was added thereto as a coagulant. A predetermined amount of the mixture was charged into a container for packed silken tofu, and the container was sealed. This container was heated at 90° C. for 40 minutes, and then cooled to obtain DHA-containing tofu.

As a result of a panel test, a test sample in which 100 g of the emulsion were added to 10 kg of the soybean milk was scarcely different from the non-added sample. However, in the test sample in which 200 g of the emulsion were added thereto gave a slight fish smell. In the test sample in which 500 g of the emulsion were added thereto gave a clear fish smell, and an unpleasant taste was provided. Further, the higher the concentration of the emulsion, the softer the tofu became.

The tofu obtained by adding 200 g of the emulsion to 10 kg of the tofu contained approximately 0.15 g of DHA per 100 g of the tofu. However, the amount of DHA which could be added was small as compared with the results in Example 1.

EXAMPLE 2

Three kilograms of the tofu obtained in Example 1 by mixing 10 kg of soybean milk with 1,600 g of the emulsion were mashed on a stainless steel plate using a spatula, and then subjected to freeze-drying. The resulting dry product was milled using a food processor to obtain 488 g of a DHA-containing tofu dry powder. One hundred grams of this powder had an oil content of 48 g, and 6.5 g of 48 g of the oil content was DHA. The thus-obtained DHA-containing tofu dry powder was completely free from a fish smell, and the taste thereof was found to be almost the same as that of a powder obtained by freeze-drying DHA-free tofu.

EXAMPLE 3

High-pressure water vapor was jetted to 10 kg of peeled soybeans for 2 minutes to deactivate an enzyme, and then ground with 50 kg of hot water of 90° C. using a grinder. The resulting slurry was filtered to obtain 30 kg of soybean milk. Two kilograms of this soybean milk were mixed with 1 kg of a DHA-containing fish oil in the same manner as in Example 1, and the mixture was stirred at 7,500 rpm for 10 minutes using a homomixer to obtain a DHA-containing fish oil emulsion.

Two kilograms of this emulsion were added to 20 kg of the above-obtained soybean milk, and they were gently stirred and mixed to obtain soybean milk containing approximately 0.7 wt. % of DHA. Further, the thus-obtained soybean milk was indirectly sterilized for several tens of seconds using a plate heater, deaerated using a reduced pressure tank and homogenized (treatment pressure: 200 kg/cm$^2$) using a high-pressure emulsifier (Laboratory Homogenizer, supplied by APV-Gaulin, Inc. in U.S.A.) to obtain 20 kg of DHA-containing soybean milk drink having a solid content of 9 wt. %. The resulting soybean milk drink was subjected to a panel test along with commercial soybean milk drink. As a result, it was evaluated that there was no fish smell and the flavor of the above-obtained soybean milk was equal to that of the commercial soybean milk.

EXAMPLE 4

Ten kilograms of the soybean milk drink obtained in Example 3 were spray-dried to obtain 750 g of a DHA-containing soybean milk dry powder. This dry powder was a yellowish white powder having a flavor of soybean milk. Even after 1 month of storage in a sealed container at 27° C., no fish smell was given out, and a good flavor was maintained.

INDUSTRIAL APPLICABILITY OF THE INVENTION

As is understood from the foregoing, in accordance with the present invention, tofu or soybean milk drink is produced such that a DHA-containing fish oil emulsion in which the same soybean milk as a starting material of tofu or soybean milk drink is used as an emulsifying agent is diluted with soybean milk to a predetermined DHA concentration. Consequently, even if DHA is contained at a high concentration, tofu or soybean milk drink can be obtained without exerting any influence on a taste or properties.

Especially, soybean milk is used as an emulsifying agent, whereby a fish smell peculiar to a DHA-containing fish oil is masked. As a result, not only tofu or soybean milk drink free from a fish smell can be produced, but also is a cost for an emulsifying agent dispensed with because there is no need to use an ordinary commercial emulsifying agent.

In addition, in view of a production apparatus or a production step, a 2-step process comprising an emulsification step (first step) of obtaining a DHA emulsion having a high DHA concentration by using soybean milk as an emulsifying agent and a dilution step (second step) of diluting the resulting emulsion with the same soybean milk to give a predetermined DHA concentration is employed, so that a relatively small-sized stirrer can be used in the first step of the emulsification. Besides, since the oil content can be increased by adding the DHA-containing fish oil at a high concentration, bubbling little occurs during the stirring. The resulting emulsion is further diluted with a large amount of soybean milk in the second step, so that bubbles almost disappeared, and there is no fear of incorporating bubbles in producing tofu.

On the contrary, when a step of diluting a DHA-containing fish oil with soybean milk to give a predetermined DHA concentration and an emulsification step are conducted simultaneously in one step, a large-sized emulsifier is required.

In practicing the above-described process of the present invention, it is sufficient that an existing tofu production apparatus or soybean milk drink production apparatus is fitted with a small-sized emulsifier, and that a DHA-containing fish oil emulsion prepared with the emulsifier is directly introduced into the existing tofu production apparatus or soybean milk drink production apparatus. Consequently, equipment investment or a cost required for change of steps can be minimized.

The dry powder of the DHA-containing tofu or the soybean milk drink can widely be used as a functional food material containing DHA, EPA, a soybean protein and a soybean oil.

We claim:

1. A process for producing DHA (docosahexaenoic acid)-containing tofu, which comprises mixing soybean milk with a DHA-containing fish oil at a weight ratio of 1:0.2 to 1 to produce a mixture, emulsifying the mixture to form a DHA-containing fish oil emulsion, diluting this emulsion with soybean milk to produce a diluted emulsion, and then coagulating the diluted emulsion with the addition of a coagulant.

2. A process for producing a dry powder of DHA-containing tofu, which comprises further dry-milling the tofu obtained in claim 1.

3. A process for producing DHA (docosahexaenoic acid)-containing soybean milk drink, which comprises mixing soybean milk with a DHA-containing fish oil at a weight ratio of 1:0.2 to 1 to produce a mixture, emulsifying the mixture to form a DHA-containing fish oil emulsion, and diluting this emulsion with soybean milk.

4. A process for producing a dry powder of DHA-containing soybean milk, which comprises further dry-milling the drinking soybean milk obtained in claim 3.

* * * * *